United States Patent [19]

Dugua

[11] Patent Number: 4,780,303

[45] Date of Patent: Oct. 25, 1988

[54] CONTINUOUS PROCESS FOR THE PREPARATION OF HIGH STRENGTH SODIUM HYPOCHLORITE SOLUTIONS

[75] Inventor: Jacques Dugua, Vernaison, France

[73] Assignee: Produits Chimiques Ugine Kuhlmann, France

[21] Appl. No.: 32,943

[22] Filed: Mar. 30, 1987

Related U.S. Application Data

[63] Continuation of Ser. No. 827,652, Feb. 7, 1986, abandoned, which is a continuation of Ser. No. 741,197, Jun. 4, 1985, abandoned, which is a continuation of Ser. No. 523,637, Aug. 15, 1983, abandoned.

[30] Foreign Application Priority Data

Aug. 24, 1982 [FR] France ............... 82 14519

[51] Int. Cl.$^4$ .................................. C01B 11/04
[52] U.S. Cl. .................................. 423/473; 423/499; 252/187.26
[58] Field of Search ............... 423/179, 196, 473, 499; 252/187.26

[56] References Cited

U.S. PATENT DOCUMENTS 3,199,949  8/1965  Clerbois et al. ............... 423/473
4,428,918  1/1984  Verlaeten et al. ............. 423/473

FOREIGN PATENT DOCUMENTS 48-42558  12/1973  Japan .................. 423/473
54-118398  9/1979  Japan .................. 423/473
58-20703   2/1983  Japan .................. 423/473
1064461    4/1967  United Kingdom ........ 423/473

*Primary Examiner*—Steven Capella
*Attorney, Agent, or Firm*—Brooks Haidt Haffner & Delahunty

[57] ABSTRACT

Processes for the continuous preparation of high concentration sodium hypochlorite which controls sodium chloride formed to prevent fouling of heat exchanger equipment and to provide sodium chloride particle sizes on the order of 400 microns or greater to facilitate filtration and reduce the mother liquor retention in the salt, which processes comprise reacting in two stages pure chlorine or chlorine diluted with inert gases with a sodium hydroxide having a concentration of from about 20 to about 50 weight percent, in which the first stage of chloration of the sodium hydroxide is carried out in an absorption column wherein the concentration of sodium hypochlorite and sodium hydroxide are respectively limited to 15% and 4.5% by weight, and in the second stage of chloration, the sodium hypochlorite solution leaving the absorption column is treated with pure chlorine or chlorine diluted with inert gases in a crystallizer equipped with suitable agitation.

10 Claims, 1 Drawing Sheet

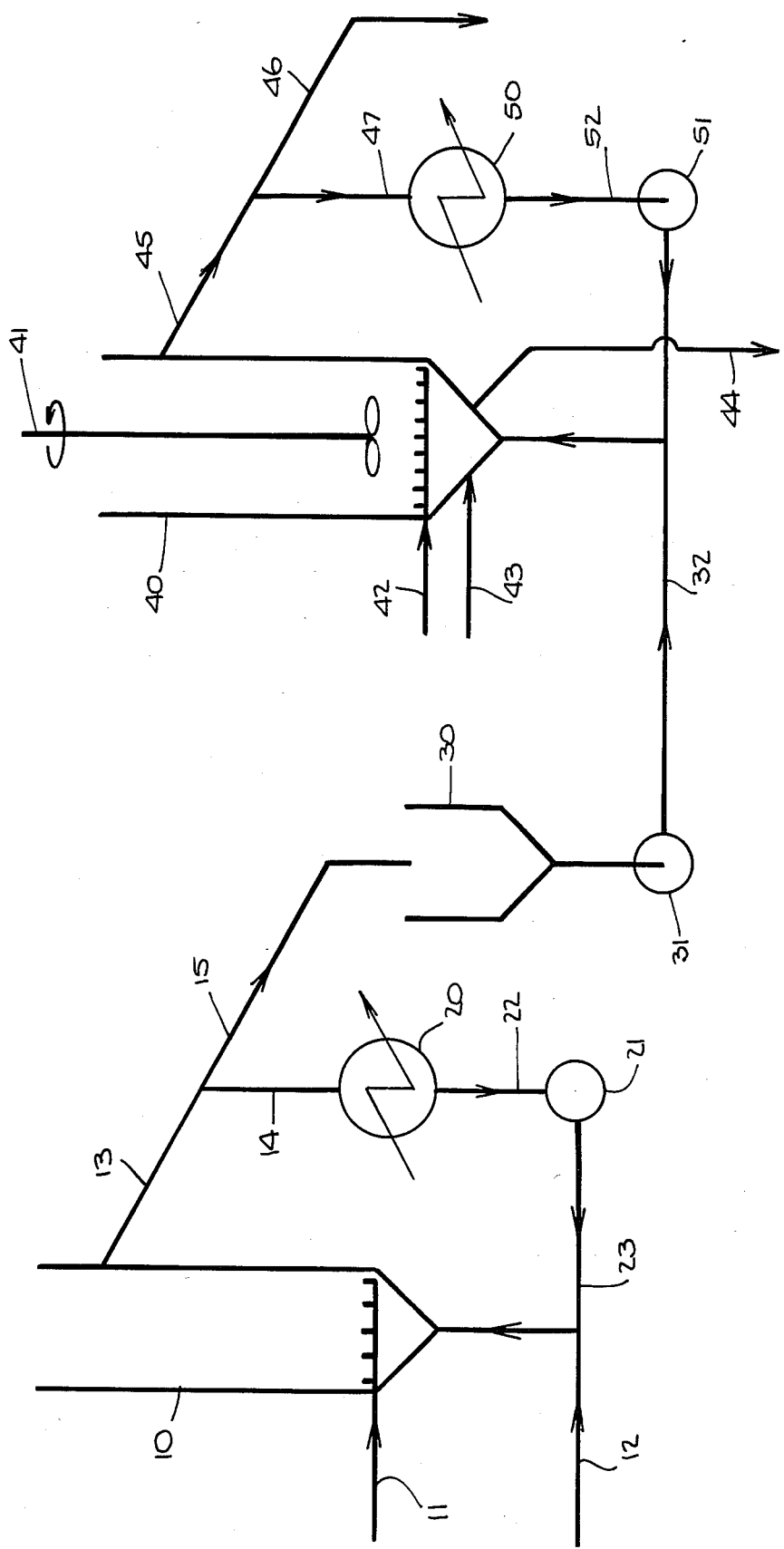

CONTINUOUS PROCESS FOR THE PREPARATION OF HIGH STRENGTH SODIUM HYPOCHLORITE SOLUTIONS

This application is a continuation of Ser. No. 827,652, filed Feb. 7, 1986 now abandoned which is a continuation of Ser. No. 741,197, filed June 4, 1985, now abandoned which is a continuation of Ser. No. 523,637, filed Aug. 15, 1983, now abandoned.

BACKGROUND OF THE INVENTION

The present invention relates to processes for the production of concentrated hypochlorite solutions, and more particularly, it relates to continuous processes for the production of concentrated sodium hypochlorite solutions.

According to the present invention, the concentrated sodium hypochlorite solutions are obtained utilizing a two-stage completely continuous chloration which permits the use of chlorine or chlorine diluted with inert gases. The first stage comprises a simple chlorine absorption column without sodium chloride precipitation. The second stage allows a concentrated sodium hypochlorite solution to be obtained after separation of the sodium chloride which is precipitated.

The concentrated sodium hypochlorite solutions contain about 25% NaClO, about 100° chlorometry being obtained in either a continuous or discontinuous operation. The difficulty in obtaining such solutions is the necessity to react a solution of concentrated sodium hydroxide, on the order of about 50% by weight, with dilute or concentrated chlorine. Under these conditions, the sodium chloride which precipitates with a relatively fine crystal size causes a high viscosity of the reaction medium. This salt is then difficult to remove from the solutions and retains, after filtration, considerable quantities of the mother liquor, all of which causes a loss of active chlorine. Moreover, to avoid decomposition of the sodium hypochlorite formed, it is necessary to keep a sufficient excess of sodium hydroxide in the sodium hypochlorite solution.

There exist techniques which permit overcoming these difficulties. French Pat. No. 1,352,198 describes a technique for obtaining 100° chlorometry sodium hypochlorite, which is about 25% NaClO, which provides for solving the crystal size problem of the salt and regulates the excess sodium hydroxide. Nevertheless, this technique is poorly adapted to use residual chlorine more or less diluted by inert gases.

Japanese Pat. Nos. 49-47292/74 and 54-118398/79 of Kokai claim obtaining concentrated hypochlorite solutions containing about 25% NaClO by a discontinuous process in a number of stages. To avoid the introduction of chlorine directly into a 50 weight percent sodium hydroxide and the formation of fine particles of sodium chloride, these two patents operate as follows: In a first stage, a 20% solution of sodium hydroxide is simultaneously introduced with some more or less diluted chlorine. A sodium hypochlorite solution containing about 12% NaClO is obtained. At the end of this first stage in the first patent, a 47% sodium hydroxide and pure chlorine are fed simultaneously up to a chloration amount of 75%. The sodium hydroxide feed is then interrupted and only the chlorine feed is maintained up to a chloration amount of about 98%. In the second of these two Japanese patents, when the total amount of sodium hydroxide is introduced into the solution to a 12% sodium hypochlorite, this causes a precipitation of sodium chloride and diluted chlorine is added to obtain a chloration titer on the order of 98%, where the NaClO content is about 25%.

In these two cases, the processes are necessarily discontinuous because, to obtain sodium chloride having a sufficient crystal size (a mean crystal size of 200 microns is only attained) to assure a good filtration and a small mother liquor retention, it is indispensable in the case of these two patents to introduce the reactants discontinuously.

THE INVENTION

The processes of the present invention provide for obtaining solutions containing about 25% sodium hypochlorite in a continuous manner utilizing pure chlorine or chlorine diluted with inert gases and a solution of sodium hydroxide in which the concentration is from about 20 to 50% by weight. The sodium chloride which precipitates has a satisfactory crystal size, that is to say, at least 400 microns, filtration of the sodium chloride is rapid, and retention of sodium hypochlorite solution is small.

Briefly, the process of the present invention comprises reacting pure chlorine or chlorine more or less diluted with inert gases with a solution containing from about 20 to about 50 weight percent sodium hydroxide in two stages. The first stage of chloration of the sodium hydroxide solution is carried out in an absorption column in which the concentrations of NaClO and NaOH in the sodium hypochlorite solution are, respectively, limited to 15% and 4.5%. These values are limiting values which should not be exceeded according to the diagram of NaCl, NaClO, NaOH, and water to avoid precipitation of sodium chloride during this first step.

The second stage of chloration of the sodium hypochlorite solution emerging from the absorption column is carried out with pure chlorine or chlorine diluted with inert gases in a crystallizer provided with suitable agitation.

In the second stage, a crystallizer is continuously fed with the sodium hypochlorite solution from the absorption column, 48-50 weight percent sodium hydroxide, and the pure or diluted chlorine. At the outlet of this crystallizer, there is continually removed, generally by overflow, about a 25 weight percent sodium hypochlorite solution saturated with about 9.5 weight percent sodium chloride and containing from 0.3 to 0.8 weight percent sodium hydroxide in excess to avoid the formation of the chlorate, $NaClO_3$. The sodium chloride formed in this second step is removed either discontinuously or continuously at the bottom of the crystallizer. The mean diameter of the sodium chloride particles is about 400 to 500 microns, this permitting a very good solid-liquid separation and a very small mother liquor retention by the solid.

The heat of reaction during these two stages of chloration is removed by two exchangers, one placed on the circulation circuit external to the absorption column, and the other on that of the crystallizer so as to keep the sodium hypochlorite solution formed at about 20° to 30° C.

The feature of the process according to the present invention is to permit obtaining more than 50% of the chloration reaction of the sodium hydroxide in the absorption column without causing precipitation of sodium chloride and thus without the risk of fouling the heat exchanger. Some chlorine containing inert gases, provided, for example, directly by electrolysis cells, or any residual chlorine whatsoever can easily be used.

In the crystallizer there is effected less than 50% of the reaction of chloration of the sodium hypochlorite solution issuing from the absorption column. The exchanger placed exteriorly to the recirculation circuit for the mother liquor of the crystallizer eliminates only about 40% of the overall heat of reaction in obtaining the approximate 25% sodium hypochlorite solution. This is advantageous for the same productivity of the crystallizer, expressed in kilograms of sodium chloride per m$^3$ of crystallizer and per hour, to permit greatly diminishing the recirculation in the crystallizer heat exchanger, which has the effect of considerably reducing the risk of entraining fine particles outside the crystallizer and particularly in the heat exchanger. The risks of fouling the heat exchanger are thus greatly reduced. Some of the diluted or residual chlorine is similarly able to be utilized in the second step without disadvantage.

Another advantage of the process according to the present invention is that the production of sodium hypochlorite solution with a concentration of about 25 weight percent of NaClO is entirely continuous, and that pure or more or less dilute chlorine with inert gases can be utilized without disadvantage at the time of the two chloration stages.

The process according to the present invention additionally leads to obtaining a sodium chloride crystal size of at least 400 microns, and this facilitates filtration and reduces the retention of mother liquor in the salt.

The invention is further illustrated in the accompanying FIGURE, which is a schematic diagram or flow sheet of the process.

Turning to the FIGURE, absorption column 10 is fed with chlorine in line 11 and sodium hydroxide in line 12. The liquid in column 10 is withdrawn through line 13 and recirculated via line 14 through heat exchanger 20, communicating by conduit 22 with pump 21 to recirculate some of the liquid withdrawn from column 10. Conduit 23 from pump 21 communicates with line 12 and thus feeds the combined stream to absorption column 10.

Some of the effluent from column 10 is fed via line 15 to holding tank 30. Liquid from the first stage is withdrawn from holding tank 30 by pump 31 and fed through conduit 32 to crystallizer 40. Crystallizer 40 is also fed with chlorine through conduit 42 and with sodium hydroxide solution through conduit 43, the crystallizer being provided with agitator 41.

Overflow is withdrawn from the crystallizer through line 45 and part is withdrawn through line 46, while the remainder is fed via conduit 47 to heat exchanger 50. The cooled liquid from heat exchanger 50 is fed via line 52 to pump 51 which returns the cooled liquid through line 53. The combined feed from conduits 32 and 53 is fed to crystallizer 40. Sodium chloride is withdrawn from crystallizer 40 through line 44, and the sodium hypochlorite product solution is recovered from conduit 46.

All parts, percentages, proportions and ratios herein are by weight unless otherwise noted.

The following Example is given to illustrate an embodiment of the invention as it is presently preferred to practice it. It will be understood that this Example is illustrative, and the invention is not to be considered as restricted thereto except as indicated in the appended claims.

EXAMPLE

Into absorption column 10 is continuously introduced 9 kg/hr of a 21% sodium hydroxide solution and 1.4 kg/hr of chlorine diluted to 60% with inert gases is fed through line 11. The temperature of the sodium hypochlorite solution formed is kept at 20°–22° C. by means of heat exchanger 20 placed on the recirculation circuit outside of column 10. The recirculation feed is powered by pump 21. The sodium hypochlorite solution leaving absorption column 10 contains 14.5% NaClO and 3.2% sodium hydroxide. The sodium hydroxide concentration is controlled by appropriate means. There is absolutely no precipitation of sodium chloride in column 10.

The approximately 10 kg/hr of sodium hypochlorite solution leaving column 10 is introduced into crystallizer 40 by means of pump 31. Crystallizer 40 is also fed with 2 kg/hr of pure chlorine diluted to 60% with inert gases and also with 4.2 kg/hr of a 50% sodium hydroxide solution. The crystallizer is equipped with agitator 41 provided to permit a rapid mixing of the reactants. The temperature inside the crystallizer is maintained at 20°–22° C. by means of heat exchanger 50 placed outside in the recirculation circuit. The amount of recirculation is powered by pump 51. The sodium hypochlorite solution leaving crystallizer 40 at the rate of about 14 kg/hr contains about 25% NaOCl, 9.5% of sodium chloride, as well as a slight excess of sodium hydroxide.

Continuously or intermittently, sodium chloride which precipitates is removed from crystallizer 40 through conduit 44. The mean crystal size of the sodium chloride removed is in the neighborhood of 400 microns, so that there is a very small sodium hypochlorite retention in the sodium chloride after subsequent filtration.

What is claimed is:

1. A continuous two-stage process for the preparation of sodium hypochlorite in high concentration which comprises introducing chlorine and from 20 to 50 weight percent aqueous sodium hydroxide into a first reaction zone to form sodium hypochlorite without any precipitation of sodium chloride, the maximum concentration of the sodium hypochlorite formed being 15 percent and the maximum concentration of sodium hydroxide being 4.5 percent; withdrawing the product from the first zone; introducing the withdrawn product, chlorine, and sodium hydroxide into a second zone and reacting the withdrawn product with chlorine under agitation; and withdrawing from the second zone the sodium hypochlorite product formed, more than 50 percent of the chloration of the sodium hydroxide to produce sodium hypochlorite taking place in said first reaction zone.

2. A process according to claim 1 in which sodium chloride is formed as a by-product and the sodium chloride crystallizes to form crystals having a mean diameter of at least 400 microns.

3. A process according to claim 1 wherein the product sodium hypochlorite solution is about 25 weight percent of sodium hypochlorite.

4. A process according to claim 3 wherein the sodium hydroxide content of less than 1 percent naturally prevents the formation of sodium chlorate.

5. A process according to claim 4 wherein the sodium hydroxide content is from 0.2 to 0.8 percent.

6. A process according to claim 1 wherein the chlorine fed to each stage is either pure chlorine or a mixture of chlorine and inert gas.

7. A process according to claim 6 wherein the quantity of chlorine mixed with inert gas is about 40 percent.

8. A process according to claim 1 wherein the temperature in each stage is maintained at from about 20° to about 30° C.

9. A continuous process for producing sodium hypochlorite as defined in claim 1, wherein the chlorine gas used in the first stage is not recycle waste gas leaving the reaction chamber.

10. A continuous process for producing sodium hypochlorite as defined in claim 1, wherein sodium chloride precipitates in the second reaction zone and has a satisfactory crystal size of at least 400 microns so that filtration of the sodium chloride is rapid and retention of sodium hypochlorite is small.

* * * * *